United States Patent [19]
Tanaka et al.

[11] Patent Number: 4,823,334
[45] Date of Patent: Apr. 18, 1989

[54] OPTICAL HEAD WITH EASILY ADJUSTABLE COLLIMATOR HAVING TWO LENS COMPONENTS

[75] Inventors: Shinichi Tanaka, Kyoto; Hiromichi Ishibashi, Toyonaka, both of Japan

[73] Assignee: Matsushita Electric Industrial Co., Ltd., Osaka, Japan

[21] Appl. No.: 935,309

[22] Filed: Nov. 26, 1986

[30] Foreign Application Priority Data

Nov. 27, 1985 [JP] Japan .................................. 60-266508
May 12, 1986 [JP] Japan .................................. 61-107904

[51] Int. Cl.$^4$ .............................................. G11B 7/00
[52] U.S. Cl. .................................... 369/112; 350/479; 350/480
[58] Field of Search ...................... 369/43–47, 369/112; 350/479, 480; 346/76 L, 135.1; 365/113

[56] References Cited

U.S. PATENT DOCUMENTS 4,264,986 4/1981 Willis ........................... 365/113 X
4,621,351 11/1986 Baer et al. .................... 369/112 X

*Primary Examiner*—Robert L. Richardson
*Attorney, Agent, or Firm*—Wenderoth, Lind & Ponack

[57] ABSTRACT

An optical head for a recording/reproducing apparatus optically recording and/or reading information onto or from a recording medium, collimates a divergent light beam radiated from a light source into a parallel light beam using a collimator lens comprised of the first and second lenses. Collimation can precisely be adjusted by adjusting only the position of second lens. The first lens is a positive lens. The second lens has a power less than the total power of the collimator lens. Collimation adjustment can be done with extreme accuracy even when disposing a prism in the path of the parallel light beam.

7 Claims, 3 Drawing Sheets

OPTICAL HEAD WITH EASILY ADJUSTABLE COLLIMATOR HAVING TWO LENS COMPONENTS

BACKGROUND OF THE INVENTION

1. Field of the Invention

The present invention relates to an optical head for an optical recording/reproducing apparatus which is capable of optically recording information on a recording medium and/or optically reproducing the recorded information.

2. Description of the Prior Art

One of the conventional prior systems provides an optical heads which is capable of directly converging a divergent light beam from a light source onto a recording medium with an objective lens. U.S. Pat. No. 4,079,247 discloses an example of the optical head mentioned above. In addition, there are a variety of optical heads which collimate the divergent light beam into a parallel light beam with a collimator lens before converging thereby freeing the apparatus from degradation of optical characteristics even when the objective lens is displaced for focussing or tracking operation or even when an inclined optical border plain exists in the parallel light beam. These optical recording/reproducing apparatuses are disclosed by U.S. Pat. Nos. 4,447,722, 4,466,087 and Japanese Patent Application of Laid-Open No. 60-106038.

The optical head disclosed by U.S. Pat. No. 4,079,247 requires extraction of a detected light beam reflected from the recording medium by separating this beam from the divergent light beam travelling toward the recording medium. This causes a problem that homogeneousness of the detected light beam easily degenerates due to angle-dependency of either a half-mirror or a polarizing beam splitter used for extracting the detected light beam. On the other hand, the optical recording/reproducing apparatuses disclosed by U.S. Pats. No. 4,447,722, 4,466,087 and Japanese patent application of Laid-Open No. 60-106038 require a delicate adjustment of the position of the collimator lens in the optical axis direction. In particular, the optical recording/reproducing apparatus disclosed by the Japanese Patent Application uses a prism having an inclined surface disposed in the path of the collimated parallel light beam, so that unavoidably the position adjustment of the collimator lens must be implemented with an extreme precision.

SUMMARY OF THE INVENTION

An object of the present invention is to provide a novel optical head which is capable of easily adjusting the position of a collimator lens when collimating a divergent light beam radiated from a light source into a parallel light beam.

To achieve the above object, according to the present invention, a collimator lens means which collimates a divergent light beam from a light source into a parallel light beam comprises first and second lenses spaced apart from each other, in which only the position of the second lens is adjusted for obtaining an adequate collimation. The first lens is a positive lens, whereas the second lens has a specific power which is less than the total power of the collimator lens. More particularly, a divergent light beam radiated from a light source such as a semiconductor laser is converted by the first lens into either a divergent beam or a convergent beam having which diverges or converges at an angle smaller than the radiation angle of the light beam radiated from the light source. Thereafter, this smaller angle divergent or convergent light beam is collimated into a parallel light beam by the second lens. Preferably, the second lens is a positive lens. More preferably, the beam reflected from the recording medium is extracted at a position between the first and second lenses with a light-separating element such as a half-mirror to be used for detecting recorded information, a focus error and a tracking error.

The configuration mentioned above allows the second lens to correctly adjust collimation for generating a parallel light beam. Since the power of the second lens is weak, an extremely fine adjustment can easily be done.

Since the divergent or convergent light beam between the first and second lenses diverges or converges at a small angle, it is possible to reduce the allowance of the angle dependency of the optical characteristic of the light separating element disposed between the first and second lenses. The detection of either the focussing error or the tracking error using the detected light beam extracted between the first and second lenses is not adversely affected by the movement of the second lens. In other words, the read-out information signal can be monitored while adjusting the position of the second lens to obtain an optimum collimation. The distance between the first lens and the light source may not be strictly adjusted. Therefore, the first lens and the light source can solidly be secured to a metal base having a low expansion coefficient in a simplified configuration, so that an extremely stable optical characteristic can be realized. ized.

The present invention is particularly effective when a prism capable of expanding the parallel light beam in anisotropic expansion is disposed in the optical path of the collimated parallel light beam. When this arrangement is provided, while monitoring the reading information signals, collimation can properly be adjusted to suppress astigmatism. Astigmatism generated at the semiconductor laser can be cancelled by the astigmatism generated at the prism mentioned above.

BRIEF DESCRIPTION OF THE DRAWINGS

The present invention will be better understood from the following detailed description taken in connection with the accompanying drawings which are given by way of illustration only and thus are not limitative of the present invention, and in which.

DESCRIPTION OF THE PREFERRED EMBODIMENTS

Figure 1:
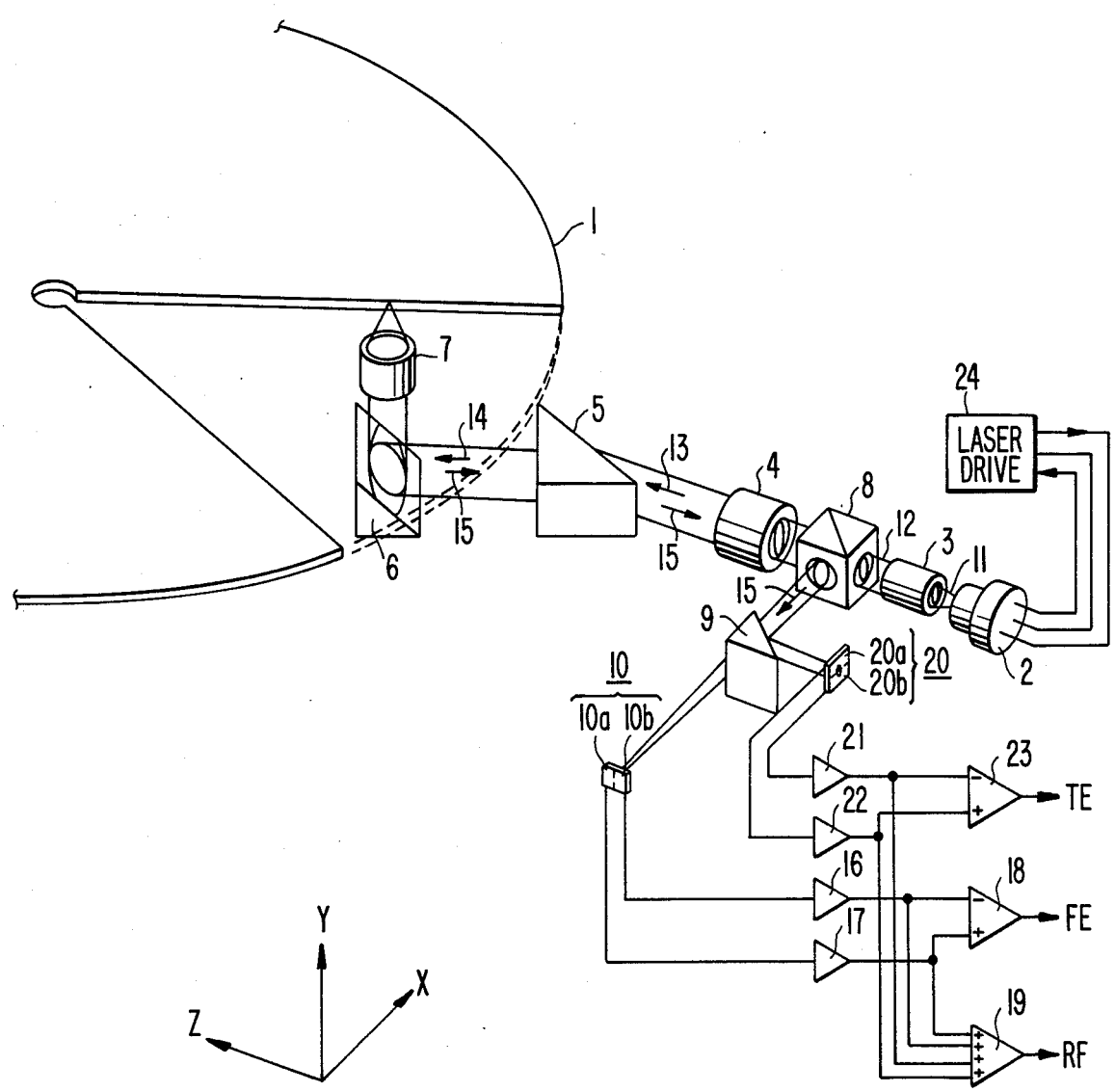
FIG. 1 is a schematic diagram showing an essential part of an optical head according to one embodiment of the present invention.

Referring now to FIG. 1, a preferred embodiment of the present invention will be described below. A semiconductor laser 2 radiates a divergent light beam 11 under control of a laser drive circuit 24. Generally, a semiconductor laser has a wide radiation angle in one specific direction, and a narrow radiation angle in a direction perpendicular to the specific direction mentioned above. Semiconductor laser 2 shown in FIG. 1 is installed so as to have a wide radiation angle in a direction Y and a narrow radiation angle in a direction X. A first lens 3 is a positive lens, and converts divergent light beam 11 to a divergent light beam 12 having a small divergent angle. A second lens 4 is also a positive lens. Divergent light beam 12 first passes through a beam splitter 8 and then is collimated by second lens 4 to become a parallel light beam 13. In other words, first and second lenses 3 and 4 jointly make up acollimator lens means.

Parallel light beam 13 can be made into an optimum condition by adjusting the position of second lens 4 either in the forward or backward direction along the optical axis thereof. Since second lens 4 has a weak power, the lens position can be easily adjusted as required, and yet, the optical characteristic of the collimator lens changes little when second lens 4 is moved back and forth within a wide movable range.

Since semiconductor laser 2 has a broad radiation angle in the direction Y, parallel light beam 13 also has an eliptical light power distribution with the major axis in the direction Y. The parallel light beam 13 is incident upon on an inclined surface of a beam-forming prism 5 at a large incident angle. As a result, parallel light beam 13 is expanded in the direction X to become a parallel light beam 14 having an isotropic light power distribution. Since parallel light beam 14 exits from another surface of beamforming prism 5 in a direction almost perpendicular to the exit surface, the light power distribution is kept isotropic. If parallel light beam 13 were not completely parallel, but were a weak divergent or convergent beam, astigmatism would be generated since the beam enters into beamforming prism 5 at a large incident angle. According to the preferred embodiment of the present invention, since collimation can properly be adjusted by adjusting the position of second lens 4 having a weak power, it is possible to significantly improve adjustment precision, thus eventually minimizing occurrence of astigmatism.

Parallel light beam 14 is reflected by a mirror 6 in the upward direction to be led into an objective lens 7. Since the light power distribution of parallel light beam 14 is isotropic, light beam 14 can effectively enter into objective lens 7. Objective lens 7 focuses parallel light beam 14 to form a light spot on a recording medium 1.

The beam focussed on recording medium 1 is reflected from recording medium 1, and then collected by objective lens 7 to be a detected light beam 15. Detected light beam 15 is substantially a parallel light beam, which inversely travels the optical path used for the passage of parallel light beam 13 and 14 and is then reflected by beam splitter 8 to be split from divergent light beam 12. Since divergent light beam 12 has a divergent angle smaller than that of divergent light beam 11, restriction against the angle dependency of optical characteristic of beam splitter 8 can be relaxed. Detected light beam 15 split by beam splitter 8 has an elliptical light power distribution and an elliptical contour, both with the major axis in the direction Y. Detected light beam 15 is split into two parts by an approximately straight line along the major axial direction of the ellipse by a mirror 9. That is, one of the two parts is reflected by mirror 9 to be led so as to a photodetector 20. Mirror 9 is substantially an asymmetrical optical element introducing asymmetry in the minor axial direction of detected light beam 15.

The other of the two parts of detected light beam 15 enters directly into a photodetector 10. Photodetector 10 is provided with a pair of photocells 10a and 10b which are adjacent to each other at a border line which is in parallel with the straight line dividing detected light beam 15. Photodetector 10 is located so that the part of detected light beam 15 can focus onto the border line to form a light spot thereon. Buffer amplifiers 16 and 17 respectively convert currents output from photocells 10a and 10b into voltages, whereas differential amplifier 18 outputs a signal corresponding to the difference of these voltages. As a result, the output signal from differential amplifier 18 becomes a focus-error signal FE which is variable in accordance with the focus error. In this way, mirror 9, photodetector 10, buffer amplifiers 16 and 17 and differential amplifier 18 jointly make up a focus error detecting means. This detection of focus error is known as shown in U.S. Pat. No. 4,079,248.

Generally, when a light spot is correctly focussed on recording medium 1, the light spot on the recording medium 1 is a conjugate image of the light source at semiconductor laser 2, whereas a spot image formed by detected light beam 15 on photodetector 10 is a conjugate image of the light spot on recording medium 1. Accordingly, if the optical relationship of the relative position of semiconductor laser 2 and photodetector 10 remains constant, when the light spot is correctly focussed on recording medium 1 the spot image is formed at a stationary position on photodetector 10. As a result, the movement of second lens 4 for adjustment does not affect the detection of focus error. Consequently, it is possible to adequately adjust the position of second lens 4 while reading the data signal from recording medium 1 by controlling the position of objective lns 7 in response to the focus error signal so that the light spot can correctly be focussed on recording medium 1.

Since the minor axis of the elliptical detected light beam 15 is perpendicular to the border line of photodetector 10, numerical aperture (NA) in this direction is small. Accordingly, the spot image formed on photodetector 10 extends its length in the direction perpendicular to the border line. This allows the position of photodetector 10 to be easily adjusted, thus improving productivity. To achieve these advantageous effects, it is not always necessary to dispose beam splitter 8 between first and second lenses 3 and 4, but it may be disposed at any location between beam-forming prism 5 and semiconductor laser 2.

On the other hand, photocells 20a and 20b of photodetector 20 are placed in positions adjacent to each other at a border line which is substantially in parallel with the information tracks on recording medium 1. The part of detected light beam 15 reflected from mirror 9 forms a farfield image across photocells 20a and 20b. Buffer amplifiers 21 and 22 respectively convert currents output from photocells 20a and 20b into voltages to allow a differential amplifier 23 to output a signal corresponding to the difference of these voltages.

In this way, the signal output from differential amplifier 23 becomes a tracking error signal (TE) which is variable in accordance with the tracking error. This detection of tracking error is known as disclosed by U.S. Pat. No. 4,059,841 for example.

For the same reason as given in connection with the focus error detection, the displacement of the position of second lens 4 does not affect the tracking error detection because the tracking error can be detected from a far field image of the detected light beam. Consequently, it is possible to adequately adjust the position of second lens 4 while stably reading information signals from recording medium 1 by properly controlling focussing and tracking. If semiconductor laser 2 generates an astigmatism, it is possible to adequately adjust collimation while monitoring the reproduced information signals in order that beam-forming prism 5 can generate an astigmatism that cancels the astigmatism generated at semiconductor laser 2.

Adder 19 adds the signals output from buffer amplifiers 16, 17, 21 and 22 to produce a signal RF which contains information recorded on recording medium 1.

Figure 2:
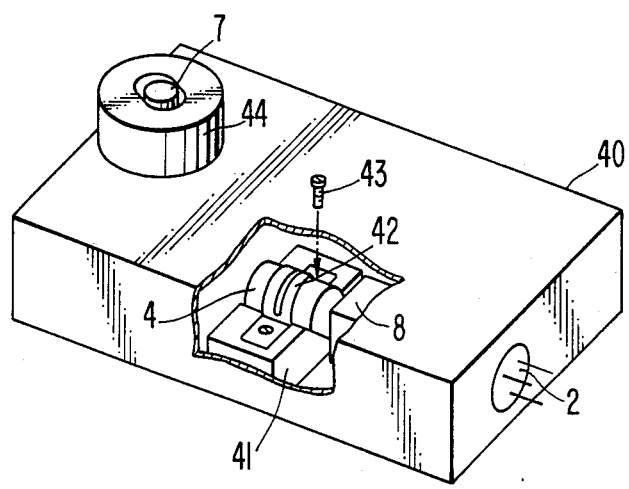
FIG. 2, is a partially cut-away perspective view of an optical head contained in a housing, according to one embodiment of the present invention.

FIG. 2 is a perspective view of an actually fabricated optical head capable of adjusting the position of second lens 4. The optical elements shown in FIG. 1 are installed in a housing 40. A V-block 41 holds second lens 4 which is movable inside the V-groove of V-block 41 along the optical axis. After adjusting the position of the second lens 4, second lens 4 can be secured to V-block 41 by a fastening spring 42 with a screw 43. The divergent light beam radiated from semiconductor laser 2 is converted by first lens (not shown) to the divergent light beam having a small divergent angle, which after passing through beam splitter 8, is collimated into the parallel light beam by second lens 4 and finally led into objective lens 7. An actuator 43 moves objective lens 7 for focussing and tracking in a known manner.

Figure 3:
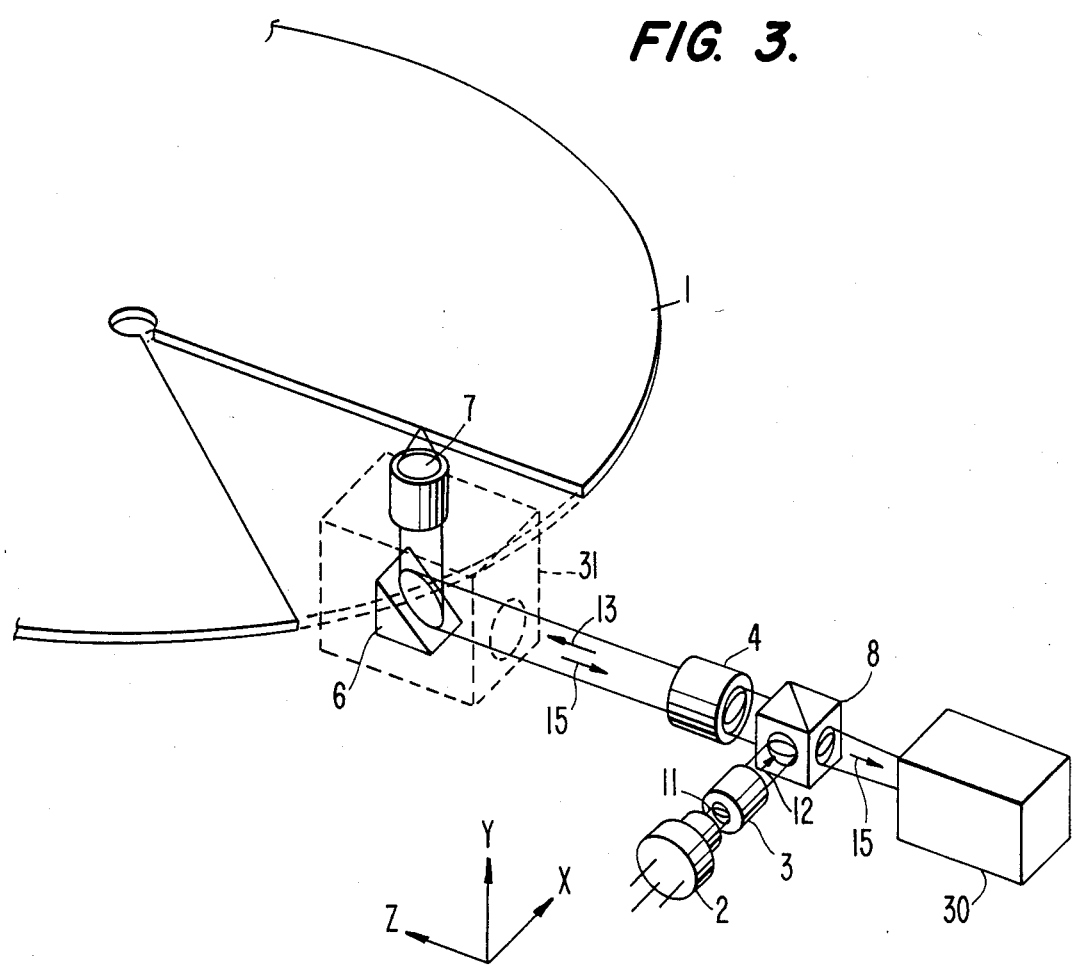
FIG. 3 is a schematic configuration diagram showing an essential part of an optical head according to another embodiment of the present invention.

FIG. 3 is a schematic diagram of another preferred embodiment of the present invention. In this embodiment, semiconductor laser 2 is positioned to have a narrow radiation angle in the direction Y. First lens 3, second lens 4, mirror 6 and objective lens 7 respectively provide the same functions as those in the embodiment shown in FIG. 1. Beam-forming prism 5 in FIG. 1 is omitted from this embodiment. Since a data reproducing apparatus which has no rewriting or recording function doesn't need to supply a significantly large optical power (which is needed for recording data) onto the recording medium, beam-forming prism 5 is not compulsorily needed. Reflection mirror 6 and objective lens 7 jointly make up a movable optical unit 31 which is movable in the radial direction of recording medium 1. Other components of the optical system in FIG. 3 are stationary. Second lens 4 is positioned so as to provide correct collimation as in the same way as the embodiment shown in FIG. 1. Optical detection system 30 may be comprised of reflection mirror 9, photodetectors 10 and 20, buffer amplifiers 16, 17, 21 and 22, differential amplifiers 18 and 23 and adder 19 as shown in FIG. 1 or it may be configured in various known manners.

Figure 4:
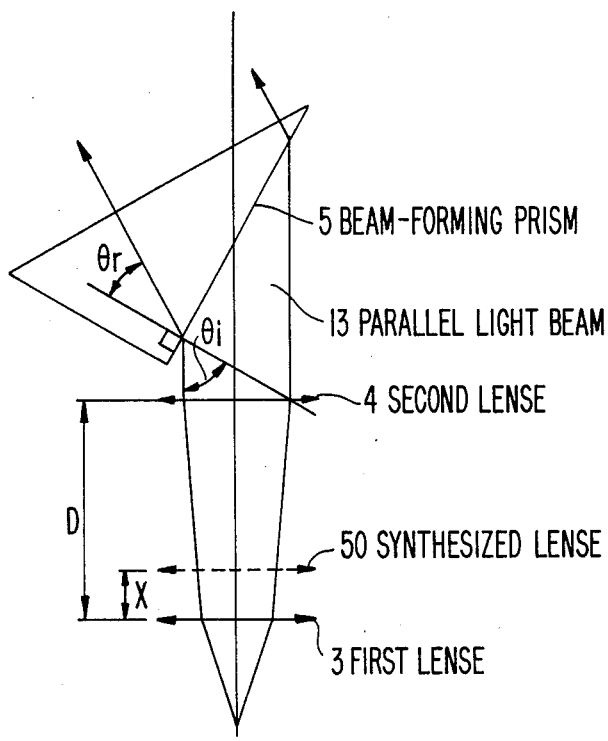
FIG. 4 is a diagram of a conceptual arrangement of the optical system illustrating the principle of the present invention.

Next, the principle of the invention will be described in more detail with reference to FIG. 4. FIG. 4 shows the arrangement of first lens 3, second lens 4 and beam-forming prism 5. FIG. 4 represents principal planes of first lens 3, second lens 4, and a synthesized lens 50 made of lenses 3 and 4. As shown in FIG. 4, assuming that the focal length of first lens 3 is $f_1$, the focal length of second lens 4 is $f_2$, and the length of the optical path between these is d, the focal length $f_0$ of synthesized lens 50 is expressed by the following equation (1):

$$f_0 = f_1 \cdot f_2 / (f_1 + f_2 - D) \quad (1)$$

If the distance between the principal planes of first lens 3 and synthesized lens 50 is x, then the distance x can be expressed by the following equation (2):

$$x = f_1 \cdot D / (f_1 + f_2 - D) \quad (2)$$

Therefore, the differential change rate of the amount of movement synthesized lens 50 to the amount of movement of second lens 4 is expressed by the following equation (3):

$$dx/dD = f_1 \cdot (f_1 + f_2) / (f_1 + f_2 - D) \quad (3)$$

For example, if $f_1 = 7$ mm, $f_2 = 40$ mm, and $D = 12$ mm, then $dx/dD = 0.27$.

This means that synthesized lens 50 merely moves itself 0.27 times the distance of movement of second lens 4, i.e., allowance for the error in the position adjustment of second lens 4 is actually expanded to 3.7 times.

Next, design requirements on the assumption that parallel light beam 14 enters into beam-forming prism 5 at an incident angle $\theta_i$ will be described below. Assuming that the refraction angle is "$_r$, the expanding rate m of the diameter of parallel light beam 14 on the incident plane is expressed by the following equation (4):

$$m = \cos \theta_r / \cos \theta_i \quad (4)$$

This "m" is called an "angular magnifying power" because the variation of $\theta_r$ caused by $\theta_i$ is m times as large as the variation of $\theta_i$.

When perfect parallel light beam 14 is assumed to be generated by radiation from a point source present in an infinitely far position, parallel light beam 14 still remains perfectly parallel after being refracted. Conversely, if parallel light beam 14 is incompletely collimated i.e., the optical path length L between an equivalent point light source and the refractive surface is finite, the optical path length L is varied to L' by refraction. The varied optical path length L' is expressed by the following equation (5):

$$L' = (\cos \theta_r / \cos \theta_i) \cdot L = mL \quad (5)$$

On the other hand, since the incident angle in the direction perpendicular to the paper-surface in FIG. 4 is 0°, the optical path length remains unchanged. This causes an astigmatism to be generated at the light source end. The astigmatic difference $\epsilon$ is expressed by the following equation (6):

$$\epsilon = (m-1) \cdot L \quad (6)$$

The astigmatic difference of the light spot on the recording medium is calculated by multiplying the astigmatic difference $\epsilon$ at the light source end by a longitudinal magnification. Assuming that the focal length of the objective lens is $f_0$ and $f_0 << L$, the longitudinal magnification is $(f_0/L)^2$. Thus, the astigmatic difference $\epsilon_0$ of the light spot on the recording medium is expressed by the following equation (7):

$$\epsilon_0 = f_0^2 \cdot (m-1)/L \quad (7)$$

A Typical objective lens has a focal length $f_0 = 4.5$ mm and a depth of focus = 1 μm. In this case, the astigmatic difference $\epsilon_0$ should be at most 1 μm. Thus, if the expanding rate m of beam diameter by the beam-forming prism is m=2, the optical path length should be as follows:

|L| ≧ 20.25 mm

As a result, if the focal length of the collimator lens is 8 mm, then the collimator lens will have a maximum of about 3 μm of position error allowance. On the other hand, according to the design example of the present invention, the second lens is provided with a maximum of 11 μm of position error allowance, which is actually 3.7 times the conventional position error allowance which is a maximum of about 3 μm as above.

Figure 5:
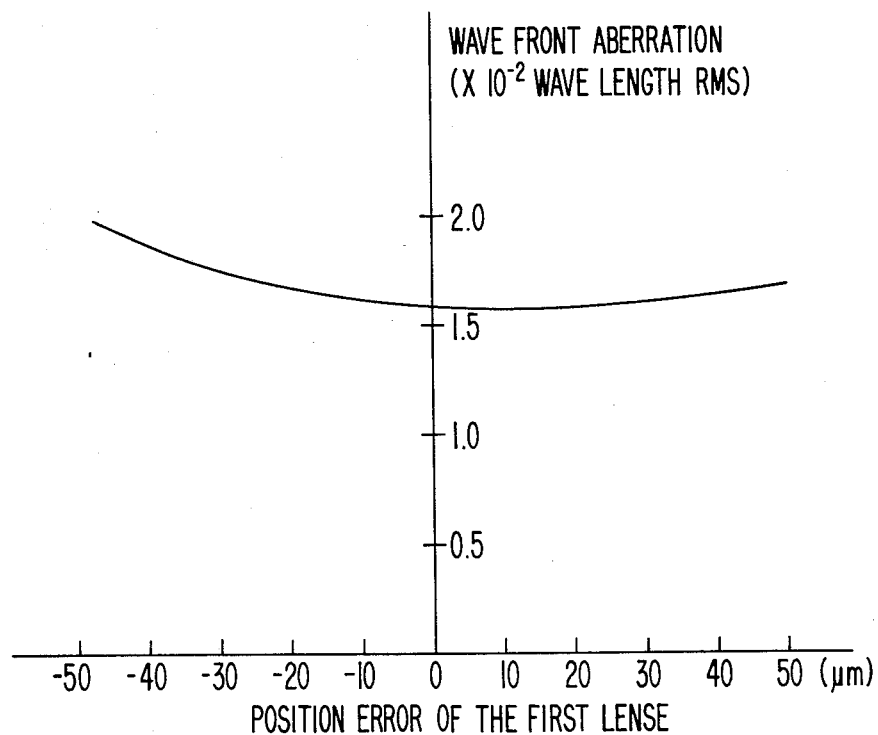
FIG. 5 is a chart showing an example of wave front aberration of the collimator lens according to the present invention.

Any amount of error that may be present in the position of the first lens can effectively be absorbed by properly adjusting the position of the second lens, thus providing a broad range of allowance. Nevertheless, if the position of the first lens significantly deviates from the standard position needed for designing the first and second lenses, a wavefront aberration may exceed the allowance. FIG. 5 shows an example of the relationship between an error with respect to the designed value related to the position of the first lens and the wavefront aberration after absorbing this error by means of the second lens, where the design requirements include the following:

$f_1 = 7.8$ mm
$f_2 = 40$ mm
$D = 10.4$ mm

The design requirements also include a beam splitter having a refractive index of 1.5 and a thickness of 6 mm, which is disposed between the first and second lenses. The shown wave-front aberration is for the case that the field angle is 1°. As is clear from FIG. 5, the first lens is provided with a minimum of 40 μm of the position-error allowance.

While only some of preferred embodiments of the present invention have been described, it will be apparent to those skilled in the art that various changes and modifications may be realized without substantially departing from the spirit and scope of the present invention as claimed. For example, the preferred embodiments described above detect light reflected from a recording medium. However, it is apparent that the effect of the present invention also includes the detection of a penetrative light beam.

What is claimed is:

1. An optical head for optically recording information on a recording medium and/or optically reproducing the recorded information from the recording medium, comprising:
   light generating means for generating a divergent light beam;
   collimation means positioned for receiving said divergent light beam from said light generating means and for collimating said divergent light beam into a parallel light beam, said collimation means having first lens means for converting said divergent light beam into a light beam which diverges or converges at a smaller angle than the angle of divergence of said divergent light beam, and second lens means for converting said light beam from said first lens means into said parallel light beam; and
   convergence means positioned for receiving said parallel light beam and for converging said parallel light beam to focus on the recording medium.

2. An optical head in accordance with claim 1, further comprising beam formation means disposed between said collimation means and said convergence means for anisotropically expanding said parallel light beam.

3. An optical head in accordance with claim 2, further comprising:
   separation means disposed between said light generating means and said beam formation means for extracting a detected light beam which is reflected from the recording medium and collected by said convergence means; and
   detection means positioned to receive the detected light beam extracted by said separation means and for detecting a focus error on the recording medium from said detected and extracted light beam.

4. An optical head in accordance with claim 1, further comprising:
   separation means disposed between said first and second lens means for extracting a detected light beam which is reflected from the recording medium and collected by said convergence means; and
   detection means for detecting a focus error on the recording medium from said detected light beam extracted by said separation means.

5. An optical head in accordance with claim 1, further comprising means connected to said second lens means for displacing said second lens means along its optical axis to adjust collimation.

6. An optical head for optically recording information on a recording medium and/or optically reproducing the recorded information from the recording medium, comprising:
   light generating means for generating a divergent light beam;
   collimation means positioned for receiving the divergent light beam from said light separating means and for collimating said divergent light beam into a parallel light beam, said collimation means having first lens means for converting said divergent light beam into a light beam which diverges or converges at a smaller angle than the angle of divergence of said divergent light beam, and second lens means for converting said light beam from said first lens means into said parallel light beam;
   convergence means positioned for receiving said parallel light beam and for converting said parallel light beam to focus on the recording medium and for collecting a detected light beam reflected from said recording medium;
   separation means positioned for receiving said detected light beam and for extracting said detected light beam; and
   detection means positioned for receiving said detected light beam extracted by said separation means and for detecting a focus error on said recording medium from said detected extracted light beam.

7. An optical head in accordance with claim 6, further comprising means connected to said second lens means for displacing said second lens means along its optical axis to adjust collimation.

* * * * *